(12) United States Patent
Clapper

(10) Patent No.: US 6,934,423 B1
(45) Date of Patent: Aug. 23, 2005

(54) INCORPORATING CAMERA EFFECTS INTO EXISTING VIDEO SEQUENCES

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/531,043

(22) Filed: Mar. 20, 2000

(51) Int. Cl.$^7$ ............................................... G06K 9/32
(52) U.S. Cl. ....................... 382/300; 382/298; 382/299
(58) Field of Search ............................... 382/300, 299, 382/284, 294, 298; 348/208.13, 208.2, 208.4, 348/441

(56) References Cited

U.S. PATENT DOCUMENTS

| | | | | |
|---|---|---|---|---|
| 5,247,651 A | * | 9/1993 | Clarisse ........................ | 703/13 |
| 5,657,402 A | * | 8/1997 | Bender et al. ............... | 382/284 |
| 5,793,435 A | * | 8/1998 | Ward et al. .................. | 348/448 |
| 6,157,747 A | * | 12/2000 | Szeliski et al. .............. | 382/284 |
| 6,229,570 B1 | * | 5/2001 | Bugwadia et al. .......... | 348/441 |
| 6,351,545 B1 | * | 2/2002 | Edelson et al. ............. | 382/107 |
| 6,370,198 B1 | * | 4/2002 | Washino ................ | 375/240.26 |

\* cited by examiner

*Primary Examiner*—Yon J. Couso
(74) *Attorney, Agent, or Firm*—Trop, Pruner & Hu, P.C.

(57) ABSTRACT

A system may be provided which enables pan and zoom features to be added to existing stored video. A graphical user interface may display a video sequence as a series of thumbnail size frame images. The user may then indicate on any two such thumbnail sizes images a region which may be enlarged. The software then interpolates the degree of enlargement and the position on the enlarged region between the two selected frames over any intervening frames.

17 Claims, 4 Drawing Sheets

INCORPORATING CAMERA EFFECTS INTO EXISTING VIDEO SEQUENCES

BACKGROUND

This invention relates generally to the editing of digital video and the enhancement of visual effects in existing video sequences.

Video sequences may be captured and stored using digital video cameras. The digital video may be stored on randomly accessible media such as a hard disk drive, a digital video disk, or a compact disk, as examples.

A number of video effects may be incorporated during the capture process to achieve artistic effects and to provide emphasis on particular features. For example, in the course of capturing the video, a zoom effect may be achieved. Without actually moving the camera, the lens focal length may change so that objects that are far away appear closer and vice versa. In addition, by moving the camera itself, a panning effect may be achieved wherein the viewer's point of view appears to change.

Once the captured digital video is stored on a storage medium, it may be desirable to modify the video to enhance its presentation. In many cases, the video camera operator may not have thought of all the possibilities for artistic or creative display of the subject matter. In many cases, the video must be captured on the fly as events occur. Thereafter, it would be desirable to inject additional effects, including the camera effects described above, to existing digital video data.

Therefore, there is a need for a way to impose camera effects on pre-existing video sequences.

SUMMARY

A sequence of frames in a recorded image may be identified. An existing recorded frame in the sequence may be modified to alter the frame as recorded. Other frames in the sequence may be modified to progressively generate the modification over the sequence of frames.

DETAILED DESCRIPTION

Figure 1:
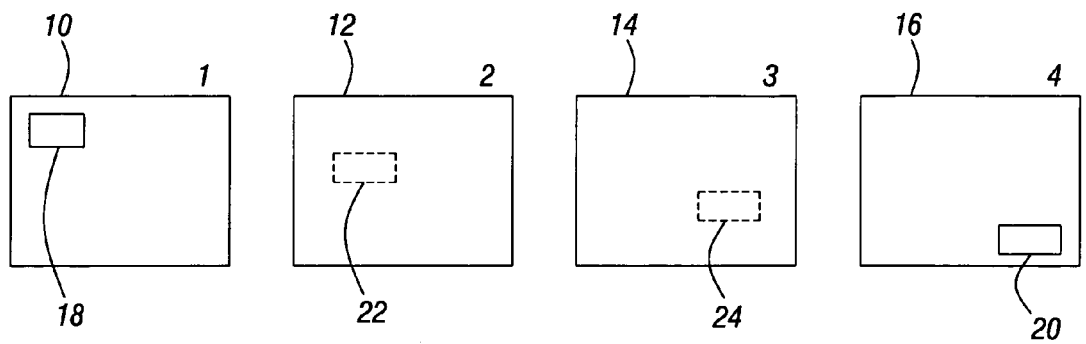
FIG. 1 is a view of a series of frames forming a video sequence in which a panning effect has been incorporated into an existing video sequence in accordance with one embodiment of the present invention.

A video sequence 11, shown in FIG. 1, includes any number of individual frames such as the frames 10, 12, 14 and 16. The sequence 11 may be a conventional video sequence that may be displayed as a storyboard having a series of thumbnail (reduced size) frames on a single display screen. Moreover, the frames 10–16 may be representative frames for a video sequence made up of a large number of frames. In one embodiment, representative frames within a larger video sequence may be selected at regular intervals over a sequence of selectable length and starting frame.

Windows 18 and 20 are overlaid on the frames 10 and 16. The windows 18 and 20 may be sized and positioned by the user using conventional drawing software in accordance with one embodiment of the present invention. The window 18 in the first frame 10 defines a portion of the overall video frame 10 which the user wishes to display full screen. Thus, the portion of the frame 10 inside the window 18 will effectively be zoomed to a larger size for display in the completed video. The zoom may be accomplished by digital data manipulation techniques such as bit mapped scaling.

Similarly, the window 20 on the last frame 16 of the sequence 11 is also independently sized. Again using conventional drawing software, an overlay may be depicted on the screen display to indicate a particular portion of the video frame 16 that will be displayed in a full screen format.

The video sequence 11 (for illustrative purposes) may include four frames. The thumbnail frames 10 and 16 constitute the beginning and the ending frames of the sequence 11. Intervening thumbnail frames 12 and 14 are representative frames between the frames 10 and 16. The user may select a portion of the first and last frame, for enlargement to full screen display. Software, in accordance with one embodiment of the present invention, interpolates the enlargement effect defined for the first and last frames over the representative intervening frames 12 and 14 and the yet undisplayed intervening frames represented by the frames 12 and 14.

In the embodiment illustrated in FIG. 1, the frames 18 and 20 may be of the same size. However, the window 18 may be positioned in a different area of the frame 10 compared to the position of the window 20 within the frame 16. The software interpolates the position of intervening windows 22 and 24 in the intervening frames 12 and 14. It may also interpolate the effect over undisplayed intervening frames represented by the frames 12 and 14. The interpolation may be linear or may use second or third order curve fitting. A bessel or spline function may be utilized for example.

In accordance with one embodiment of the present invention, a straight line interpolation may be used between the center point of the window 18 and the center point of the window 20. Thus, figuratively, a straight line is drawn between the center points of the windows 18 and 20. Depending on the number of intervening frames, a number of intervening windows, equal to the number of intervening frames, are incorporated in an equally spaced pattern along the length of the figurative line. Thus, as shown in FIG. 1, the windows 22 and 24 progressively move from the position indicated by the window 18 to the position shown for the window 20. Again, other non-linear interpolation techniques may be used as well.

The effect of these progressive window positions is to create a panning effect in the finished video which, as recorded, had no such panning effect. Namely, the camera's angle of view appears to move, by moving the viewed region within the existing video frames. Thus, within the constraints defined by the existing video frames, an illusion of panning may be created. In the example of FIG. 1, the camera appears to pan from the upper left portion of a depicted image to a lower right portion. Even though there was no actual movement of the camera that recorded sequence 11, the appearance of camera movement may be achieved.

Figure 2:
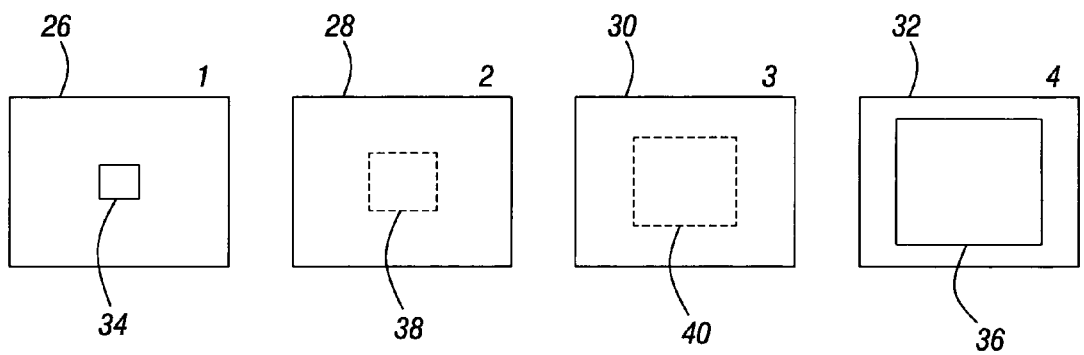
FIG. 2 is a view of a series of frames forming a video sequence in which a zoom effect has been incorporated into an existing video sequence in accordance with one embodiment of the present invention.

Referring to FIG. 2, a zoom effect may be incorporated into video which was not originally recorded with this effect. Again, a series of thumbnail frames 26, 28, 30 and 32 represent a sequence 25 made up of a large number of frames that, when displayed successively, form a video display. The first frame 26 has a window 34 defined centrally thereon of a given size and the last frame 32 has a window 36 of a larger size. The smaller the defined window, the greater the enlargement of the existing material within the window to form a full screen image. Thus, in the embodiment illustrated in FIG. 2, the image created from frame 26 is enlarged more than the image created from frame 32.

Again, a straight line interpolation may be achieved in the intervening frames 28 and 30 using a software interpolation technique in one embodiment of the invention. Thus, the intervening windows 38 and 40 become progressively larger as one extends from the first frame 26 to the last frame 32. The effect is that of a zoom out where it appears that the camera is actually moving back from the imaged object. In fact, no such zooming feature was incorporated in the video as originally recorded.

Figure 3:
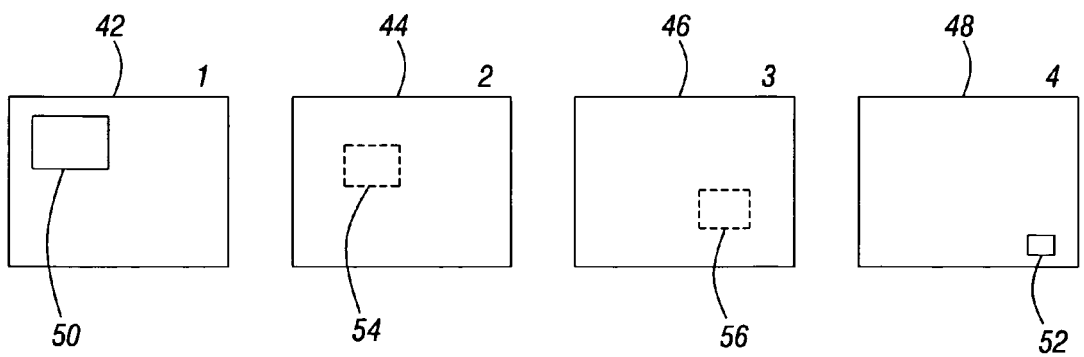
FIG. 3 is a view of a series of frames in which both panning and zoom effects have been incorporated into an existing video sequence in accordance with one embodiment of the present invention.

Referring next to FIG. 3, a sequence 41 of frames 42, 44, 46 and 48 show the effect of combining the panning and zooming effects illustrated in connection with FIGS. 1 and 2. In this example, a relatively larger window 50 is positioned in the upper left corner of the first frame 42 and a relatively smaller window 52 is positioned in the lower right corner of the last frame 48. Windows 54 and 56 are interpolated between the windows 50 and 52 in the intervening frames 44 and 46 and any undepicted intervening frames represented by the frames 44 and 46. Thus, the windows 54 and 56 are interpolated both in terms of window size and window position. In the illustrated embodiment, a straight line interpolation is incorporated with respect to the change in window position and the change in window size. The linear changes may be progressively applied based on the number of intervening frames to create a smooth effect in one embodiment of the invention.

While embodiments of the present invention have been described with the use of linear interpolation techniques, other known interpolation techniques may be utilized as well. By receiving a user selection of an effect for a first and last frame of a sequence, the system may automatically apply any type of interpolation to the intervening frames to create a transition between the effect in the first selected frame to the effect in the last selected frame.

Figure 4:
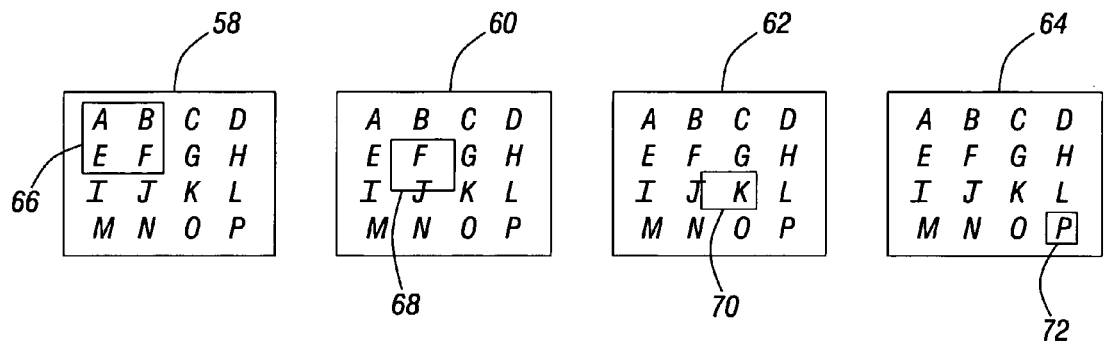
FIG. 4 is a sequence of four identical video frames of the letters A–P in a grid-like array to show how panning and zoom effects are incorporated into an existing video sequence in accordance with one embodiment of the present invention.
Figure 5:
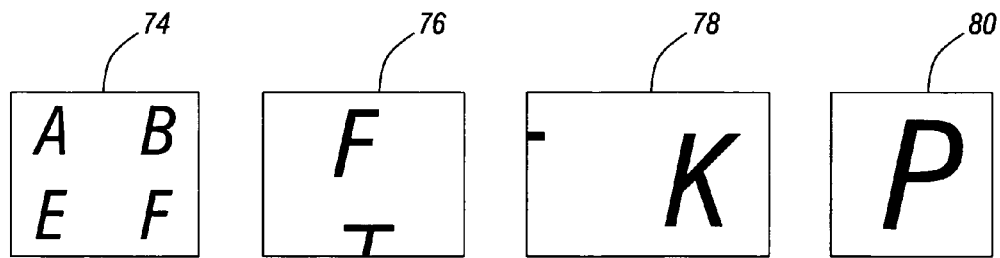
FIG. 5 shows the panning and zoom effects that result from the user selections indicated in connection with FIG. 4 in accordance with one embodiment of present invention.

FIGS. 4 and 5 show the visual effect of incorporating panning and zooming into previously recorded video. In FIG. 4, the frame 58 corresponds to the frame 42 of FIG. 3 and the frame 64 corresponds to the frame 48 in FIG. 3. A window 66, which is larger in size, is positioned in the upper left corner of the frame 58 and a window 72 which is smaller in size is positioned in the lower right corner of the frame 64. Windows 68 and 70 are interpolated into the intervening frames 60 and 62.

In FIG. 4, a display of the letters from A to P are arranged in the grid work in order to better show the zooming and panning effect. The effect of the window 66 is shown in FIG. 5 at frame 74. The letters A, B, E and F are shown enlarged and in a full screen view (represented by a thumbnail view in FIG. 5). Similarly, interpolated window 68 in FIG. 4 becomes the full size frame 76 of FIG. 5. In this case, the letter F is enlarged a little bit more than the letters in the frame 58. Moreover, the position of the window is slightly offset along the diagonal between the center points of the windows 66 and 72. Thus, the letter F appears somewhat larger than the letter A and the letter J (which is slightly cut off) is also shown enlarged. Next, the window 70 creates the frame 78 in full size. The letter K in frame 78 is larger than the letter F. In addition, the window 70 is offset along the diagonal which connects the center points of the windows 66 and 72 with respect to the depiction shown as frame 76. Finally, the window 72 results in the full screen display 80 of an enlarged letter P. Thus, the angle of view from the apparent camera changes across the display of frames and a zooming effect is also achieved.

While it is illustrated in connection with video frames with a still background (such as a series of letters), the present invention may be applied with equal validity to scenes which create moving images from frame to frame. Each frame still constitutes an individual still image, and the zooming and panning effect can be applied to video sequences of moving images in the same way as was illustrated in connection with unchanging images or a series of still images.

Figure 6:
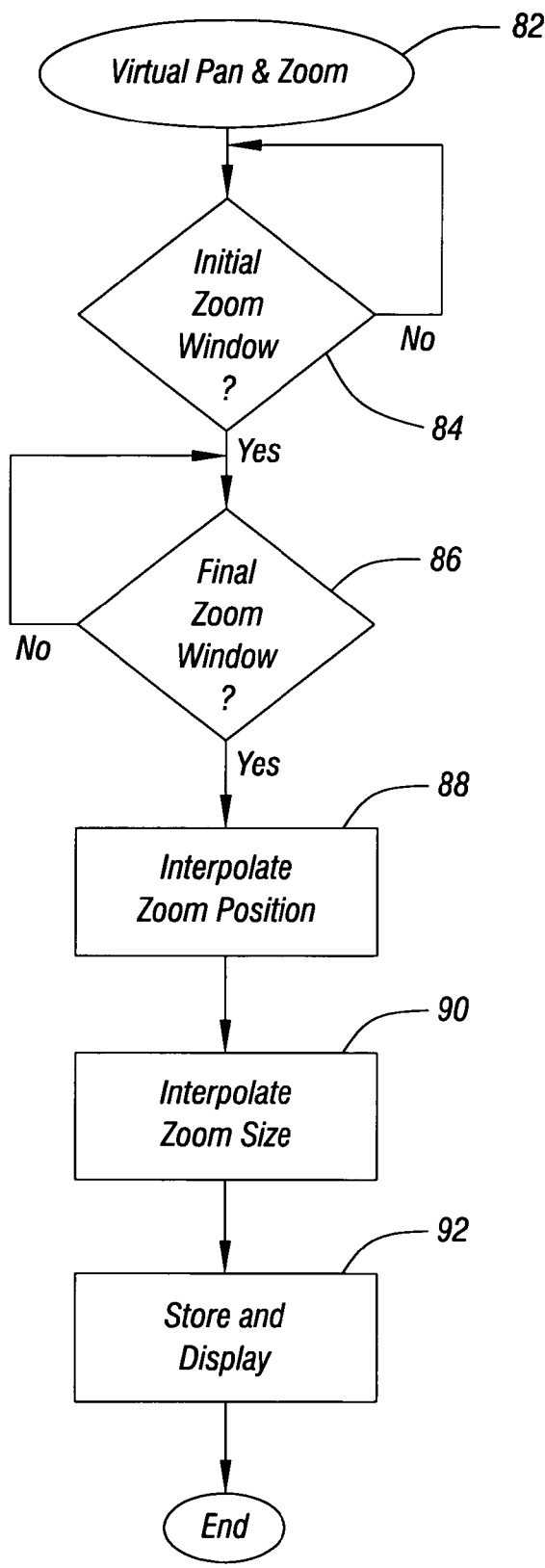
FIG. 6 is a flow chart for software implementing one embodiment of the present invention.
Figure 7:
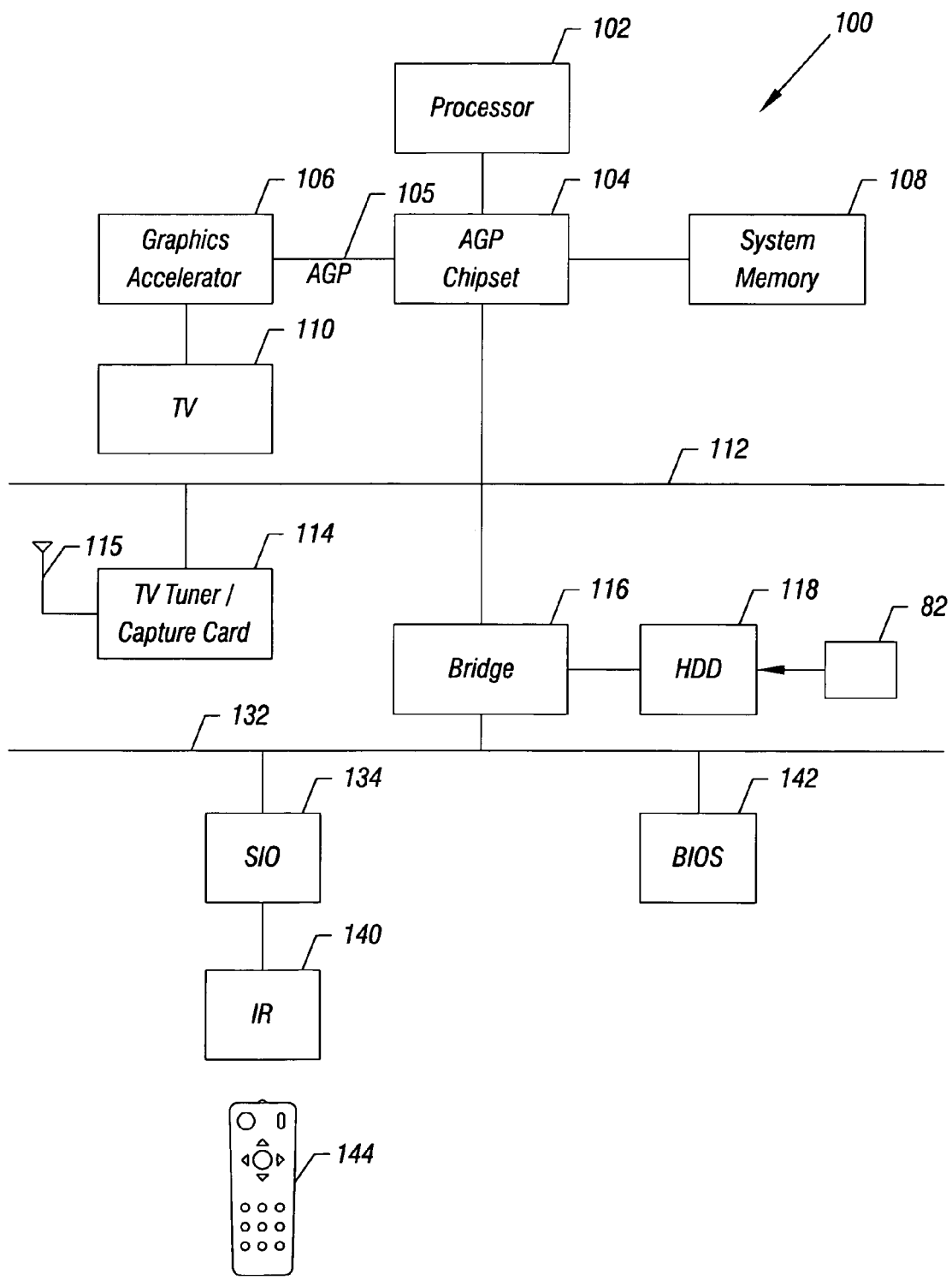
FIG. 7 is a block diagram of hardware in accordance with one embodiment of the present invention.

Referring next to FIG. 6, the software 82 for creating the zoom and pan effects in existing video begins by awaiting the user selection of an initial zoom window as indicated in diamond 84. Once the user selects the frame to begin the imposition of the camera effect and defines a window thereon using a frame-like overlay, the system records the initial sequence and the overlaid region. The imposition of the video overlay can be achieved with conventional video overlay and drawing software.

Next, at diamond 86, the flow awaits the selection of a final zoom window. Once the user defines the initial frame, the final frame, and the windows in each of the beginning and ending frames, the system may begin the interpolation between those windows as indicated in block 88. In one embodiment of the present invention, the interpolation for the panning and zooming effects can be done in two separate steps. In the block 88, the position is interpolated and in block 90 the zoom size is interpolated.

Thus, the window position is interpolated in intervening frames, in one embodiment of the present invention, by a straight line interpolation between the center of the window in the first frame and the center of the window defined in the last frame. Similarly, the zoom window size may be interpolated by calculating the area of the first window and the last window, and interpolating the area linearly across the intervening frames.

Once the windows and beginning and ending frames have been assigned, and the interpolation has been completed, a new sequence of video frames is constructed and stored as indicated in block 92. If desired, the new video sequence may be displayed either as a new set of thumbnails or as a finished video. The new video sequence may be stored as a separately accessible standalone file.

All these video sequence effects may be accomplished using digital video stored on a randomly accessible storage media. A wide variety of such systems are available. For example, conventional processor-based systems such as desk top computers or lap top computers have hard disk drives which may store video sequences. In addition, some video cameras may have sufficient storage and processing capability to implement the interpolations described above. Also some appliances such as televisions may now or may eventually have the processing capability to accomplish these effects. Similarly, some playback devices may now or in the future have the capability of implementing these effects. For example, digital versatile disk players may have sufficient processing capability and memory to implement these effects.

In accordance with one embodiment of the present invention, a set-top box processor-based system 100 includes a processor 102, as shown in FIG. 2. The processor 102 is coupled to an accelerated graphics port (AGP) chipset 104. The AGP chipset 104 is coupled between a system memory 106 and an accelerated graphics port 105. The port 105 is coupled to a graphics accelerator 106 which controls a display on a television receiver 110. Thus, the display shown in FIGS. 1–5 may actually be depicted on the television receiver display in accordance with one embodiment of the present invention.

The chipset 104 may also couple to a bus 112. The bus 112 is connected to a conventional television tuner/capture card 114 which receives an input from an antenna 115 such as a broadcast antenna, a satellite antenna or a cable distribution connection.

A bridge 116, coupled to the bus 112, is also coupled to a hard disk drive 118 which may store the software 82 as well as the sequence of video described previously. The bridge 116 may also be coupled to another bus 132 which is in turn coupled to a serial input/output (SIO) device 134. The device 134 receives serial inputs from an interface 140. In one embodiment of the present invention, the interface 140 may be an infrared interface which receives inputs from an infrared based remote control unit 142. Also coupled to the bus 132 is a basic input/output system (BIOS) 142.

Thus, in accordance with one embodiment of the present invention, the selection of the windows in the various frames may be controlled by the user from the remote control unit 144. In particular, the creation of thumbnail versions of a video may be implemented in software and the overlay of the window 66, for example, may be done using conventional drawing software. By simply clicking on a thumbnail, a window overlay is created and then the user can use cursor controls to increase the size of the window and its shape.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   identifying a sequence of frames of recorded image information;
   modifying an existing recorded frame in said sequence to alter the frame as recorded; and
   modifying said other frames in said sequence to progressively generate said modification over said sequence of frames.

2. The method of claim 1 wherein identifying a sequence of frames includes identifying a first frame of the sequence and the last frame of the sequence.

3. The method of claim 1 wherein modifying an existing recorded frame includes enlarging the image depicted in said recorded frame.

4. The method of claim 1 wherein modifying an existing recorded frame includes changing the angle of the frame to create a pan effect.

5. The method of claim 1 including modifying the last frame of said sequence and modifying the other frames in said sequence to sequentially and progressively implement the change in the last frame over the other frames in said sequence.

6. An article comprising a medium storing instructions that, if executed, enable a processor-based system to:
   identify a sequence of frames of recorded video information;
   modify an existing recorded frame in said sequence to alter the frame as recorded; and
   modify said other frames in said sequence to progressively generate said modification over said sequence of frames.

7. The article of claim 6 further storing instructions that, if executed, enable a processor-based system to identify a first frame of the sequence and the last frame of the sequence to identify a sequence of frames.

8. The article of claim 6 further storing instructions that, if executed, enable the processor-based system to enlarge the image depicted in the recorded frame.

9. The article of claim 6 further storing instructions that, if executed, enable the processor-based system to change the angle of the frame to create a pan effect.

10. The article of claim 6 further storing instructions that, if executed, enable the processor-based system to modify the last frame of said sequence and modify the other frames and said sequence to sequentially and progressively implement the change in the last frame over the other frames in said sequence.

11. A system comprising:
    a processor; and
    a storage coupled to said processor, said storage storing software that, if executed, enables said system to identify a sequence of frames of recorded video information, modify an existing recorded frame in said sequence to alter the frame as recorded, and modify the other frames in said sequence to progressively generate said modification over said sequence of frames.

12. The system of claim 11 including a display coupled to said processor.

13. The system of claim 11 wherein said storage stores a graphical user interface which displays a video sequence as a series of thumbnail frames.

14. The system of claim 11 wherein said software includes instructions for identifying a first frame of the sequence and a last frame of the sequence.

15. The system of claim 11 wherein said software storage includes instructions to enlarge the image depicted in the recorded frame.

16. The system of claim 11 wherein said software includes instructions to change the angle of the frame to create a pan effect.

17. The system of claim 11 wherein said software includes instructions to modify the last frame of said sequence and modify the other frames of said sequence to sequentially and progressively implement the change in the last frame over the other frames in said sequence.

* * * * *